June 28, 1949. A. ROTHFUCHS 2,474,328
JUNCTION BOX FOR ELECTRIC LINES
Filed Jan. 8, 1946
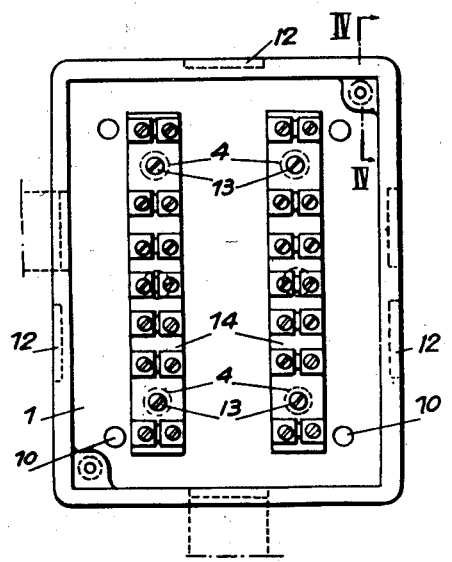
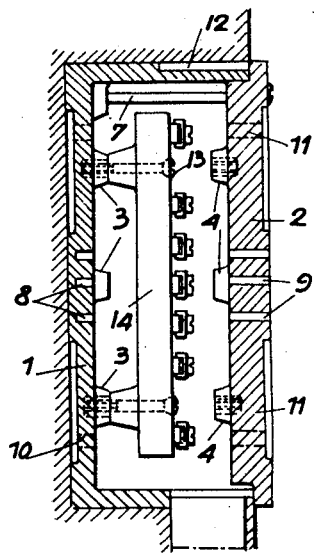
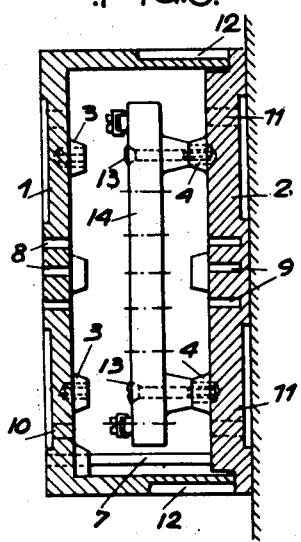
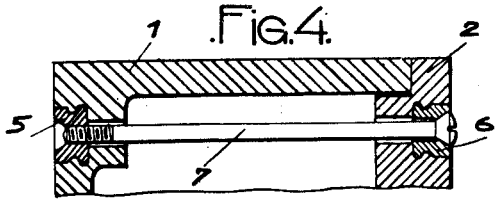
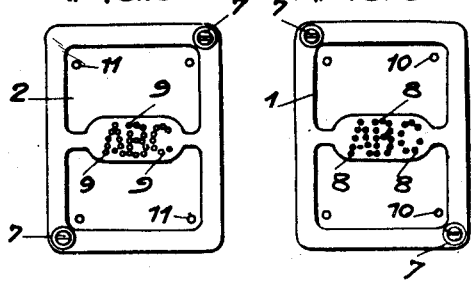
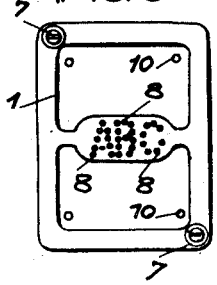
Inventor:

Patented June 28, 1949

2,474,328

UNITED STATES PATENT OFFICE 2,474,328

JUNCTION BOX FOR ELECTRIC LINES

Alfred Rothfuchs, Zurich, Switzerland

Application January 8, 1946, Serial No. 639,851
In Sweden February 22, 1944

3 Claims. (Cl. 174—50)

My invention relates to new and useful junction-boxes for electric lines which may be positioned to project from a wall or support or may be embedded in a wall, whereby their manufacture and fitting in position is greatly simplified.

Junction-boxes of this type are known already, in which the box consists of two parts, namely, a housing and a closing plate which are shaped in such a manner that, for embedding said box in a wall, said housing serves as the housing proper and the closing plate as a cover, whereas when using the box as a junction-box on or placed against a wall, the closing plate serves as a base and the housing as a cover. But, in both forms of application, the faces forming the front of the two parts of the box are of different structures and appearance, which, in the installations of electric lines lead easily to confusions and do not facilitate checking. The known junction-boxes have, in addition, the disadvantage, from the technical point of view, that no vents for air circulation are provided which are required in a simple manner and form, particularly when the box is embedded or set in a wall. Moreover, it is necessary in said known junction-boxes to provide special anchorage members for fitting them when they are being set in or embedded in a wall.

One object of the invention is to remedy the above disadvantages in a simple manner by creating a junction-box for electric lines which can be alternately placed on a wall or support or set in a wall, which box comprises a component in the shape of a box or housing and a component in the form of a cover plate, holes in the bottom of the box and in the cover plate for the passage of parts for securing the same to the wall. The box is further equipped with means of support correspondingly arranged on the inner face of the bottom or end wall of the box and on the inner face of the cover plate, further with carrier bridges for terminals which can be fitted alternately on said supporting means placed on the end wall of the housing or on those supporting means disposed on the inner face of the cover plate, and also with means for securing the cover plate to the box.

Another object is to create a construction of junction-boxes of this type in which the outer face of the end wall or bottom of the box and the outer face of the cover may have the same appearance and in which each of their faces present thinned down or weakened portions or portions of lesser resistance which can be punctured to form an inscription or an emblem while at the same time constituting vents or openings for the circulation of the air.

Another object of the invention is to create a construction of this type in which tapped holes and fixed nuts are provided in angles of the two components of the box and assembling bolts pass through the tapped holes of one of the components so as to screw in, by their ends, in the tapped holes of the other component.

The tapped holes or the bolts preferably present a recess intended to accommodate the countersunk heads of the bolts.

Further objects and advantages of my invention will be apparent from the description and claims.

In the drawing, in which an embodiment of my invention is illustrated:

Fig. 1 is an inside view of the component on the junction-box which forms the housing.

Fig. 2 is a longitudinal section of the junction-box fitted by bedding.

Fig. 3 is a longitudinal section of the box fitted in a jutting out position on the rendering of the wall.

Fig. 4 is a part section to a larger scale according to line IV—IV of Fig. 1.

Fig. 5 shows the underneath of the bottom of the box after the cutting out of the inscriptions.

Fig. 6 is a similar view of the cover.

The junction-box illustrated consists of two parts 1 and 2, preferably made of Bakelite or of some other artificial material, the first part 1 possessing a bottom or end wall and lateral walls, whereas the second part 2 is flat. The two parts are each provided, on their inner faces, with three projections or eyelets 3 and 4 tapped to accommodate anchoring screws. In addition, the two parts 1 and 2 of the box carry at two of their diagonally opposite corners tapped nuts 5 and 6 (Fig. 4) each bearing recesses for the accommodation of the countersunk heads of screws 7 serving to join together parts 1 and 2. Said screws can be introduced from one side as well as from the other into the nut of one of the parts of the box and screwed into the nut of the other part of the box, for the screw thread projects beyond the shank or body of the screw. The walls of the component parts 1 and 2 comprise each in thinned down or weakened portions 8 and 9 forming an inscription or emblem and intended to be perforated and for instance to indicate the nature of the installation to which the box is connected up. In addition, there are in the two parts 1 and 2 anchorage holes 10 and 11 through which screws, nails, pins or other attaching members can be driven into the wall; then the side walls of part 1 include further thinned down portions in the form of depressions 12, which can be punctured at suitable points for introducing electric leads.

Fig. 2 shows the junction-box 1—2 in embedded position or mounting. Component 1 carries by means of screws 13 held in tapped projections or eyelets 3 small bridges 14 in form of bars, on which are arranged the terminal posts, for the connection with the electric lines. In this embodiment, the hollowed portions 8 of component part 1 are not perforated so that dampness from the walls may not be able to penetrate into the junction-box; on the other hand, hollowed portions 9 of component 2 are punctured and offer a guide mark visible from the outside. At the same time, the portions thus punctured serve as ventilating openings. The recesses 12 provided in the lateral walls of component part 1 of the junction-box serve just as well for the introduction of the electric lines as for the anchoring of this part of the box in the wall where it is encased in cement.

In Fig. 3, the same junction-box is shown mounted on the outside of a wall or support. The terminal posts carrying bridges 14 are secured to the flat part 2 by means of the screws 13 held in tapped projections or eyelets 4. Moreover, the three hollowed portions 9 of component part 2 are left obstructed on the wall side, but, on the hollowed portions 8 of component part 1 are perforated to serve as guide marks and constitute ventilating openings.

As is visible in Figs. 5 and 6 the frontal view in front of or behind the two components of the junction-box is the same in both kinds of mounting; embedded or fixed to the outside, except as regards the securing screws which are at the opposite corners. Instead of eyelets 3 and 4 the two component parts of the present junction-box may be arranged in any other manner as to permit the fixing of the parts for connecting up the wires of the electric line.

The junction-box described in the above example renders possible, due to the new form of the essential parts as compared with what is known, not only an important unification for this special field of application, in particular the exclusion of non examination or of the possibility of confusion or errors which might result from peculiar shapes of junction-boxes but further the ensuring of an essential simplification of the possibility of mounting on both sides. Owing to the shape of such boxes according to the invention, it is, in addition, easy to install the two components of the box properly and rapidly without special equipment at the spots where the mountings must be made for all cases, for instance, by simply breaking the desired places or partitions, the necessary vents can be obtained and by them also the desired inscriptions, or again the securing by embedding in cement.

Further modifications will be apparent to those skilled in the art and it is desired, therefore, that the invention be limited only by the prior art and the scope of the appended claims.

Having thus described my invention, what I claim and desire to secure by Letters Patent is:

1. A junction box of the character described comprising two interfitting parts, a hollow housing and a cover plate for said housing, respectively, said housing having an end wall arranged opposite said cover plate, inwardly directed and opposed projections disposed on the respective inner faces of said end wall and of said cover plate, said projections being adapted for detachably mounting thereon a carrier for terminals, and diagonally disposed securing means engaging said end wall and said cover plate independently of the position of the cover plate with respect to a support to which said junction box may be applied or in which said junction box may be set in, selectively.

2. A junction box according to claim 1, wherein said projections form anchorage members for holding a carrier for terminals in spaced relation to the inner faces of said end wall and of said cover plate, respectively.

3. A junction box according to claim 1, wherein said securing means consist of threaded bolts for the engagement of nuts, the outer faces of said end wall and of said cover plate being provided with respective recesses for interchangeably inserting said nuts therein.

ALFRED ROTHFUCHS.

REFERENCES CITED

The following references are of record in the file of this patent:

UNITED STATES PATENTS

| Number | Name | Date |
|---|---|---|
| 2,352,913 | Parker | July 4, 1944 |

FOREIGN PATENTS

| Number | Country | Date |
|---|---|---|
| 761,593 | France | 1934 |